United States Patent [19]

McIntyre

[11] Patent Number: 5,713,712

[45] Date of Patent: Feb. 3, 1998

[54] METHOD AND APPARATUS FOR COVERING AN OPEN-TOP TRAILER

[75] Inventor: David R. McIntyre, Wilmington, N.C.

[73] Assignee: MCO Transport, Wilmington, N.C.

[21] Appl. No.: 629,215

[22] Filed: Apr. 8, 1996

[51] Int. Cl.⁶ ............................................. B65G 67/06
[52] U.S. Cl. ......................... 414/328; 296/100; 414/572
[58] Field of Search ................... 414/397, 328, 414/393, 402, 572, 329; 296/98, 100

[56] References Cited

U.S. PATENT DOCUMENTS

| | | | |
|---|---|---|---|
| 1,207,795 | 12/1916 | Riekerberg | 414/393 |
| 1,329,392 | 2/1920 | Ford | 414/402 X |
| 2,662,650 | 12/1953 | Russell | 414/393 X |
| 2,923,423 | 2/1960 | Maney | 414/402 X |
| 3,666,119 | 5/1972 | Parsons | 414/328 |
| 4,095,840 | 6/1978 | Woodard | 296/100 |
| 4,162,100 | 7/1979 | Muscillo | 296/100 |
| 4,189,178 | 2/1980 | Cramaro | 296/100 X |
| 4,225,175 | 9/1980 | Fredin | 296/100 X |
| 4,341,416 | 7/1982 | Richard | 296/100 X |
| 4,673,208 | 6/1987 | Tsukamoto | 296/100 X |
| 4,740,029 | 4/1988 | Tuerk | 296/100 |
| 4,858,984 | 8/1989 | Weaver | 296/100 |
| 4,874,196 | 10/1989 | Goldstein et al. | 296/98 |
| 4,944,551 | 7/1990 | Hardy, Jr. | 296/100 |
| 5,275,459 | 1/1994 | Haddad, Jr. | 296/100 |
| 5,295,779 | 3/1994 | Mihalich et al. | 414/402 X |
| 5,354,113 | 10/1994 | Pettersson | 296/98 |

FOREIGN PATENT DOCUMENTS

| | | | |
|---|---|---|---|
| 1181917 | 9/1985 | U.S.S.R. | 296/100 |
| 870530 | 6/1961 | United Kingdom | 414/393 |
| 2 109 758A | 6/1983 | United Kingdom | |
| 2 222 118A | 2/1990 | United Kingdom | 296/100 |

*Primary Examiner*—David A. Bucci
*Attorney, Agent, or Firm*—Myers Bigel Sibley & Sajovec, L.L.P.

[57] ABSTRACT

The invention is directed to a method and apparatus for covering open-top truck trailers used to haul wood chips and the like. A flexible cover is pulled over the open top of a trailer via a shaft rotatable between a first and second position; a projection extending from the shaft and configured to engage the flexible cover when the shaft is in a first position and to disengage the flexible cover when the shaft is in a second position; and a counterweight extending from said shaft and configured to rotate the shaft from a second position to a first position.

15 Claims, 4 Drawing Sheets

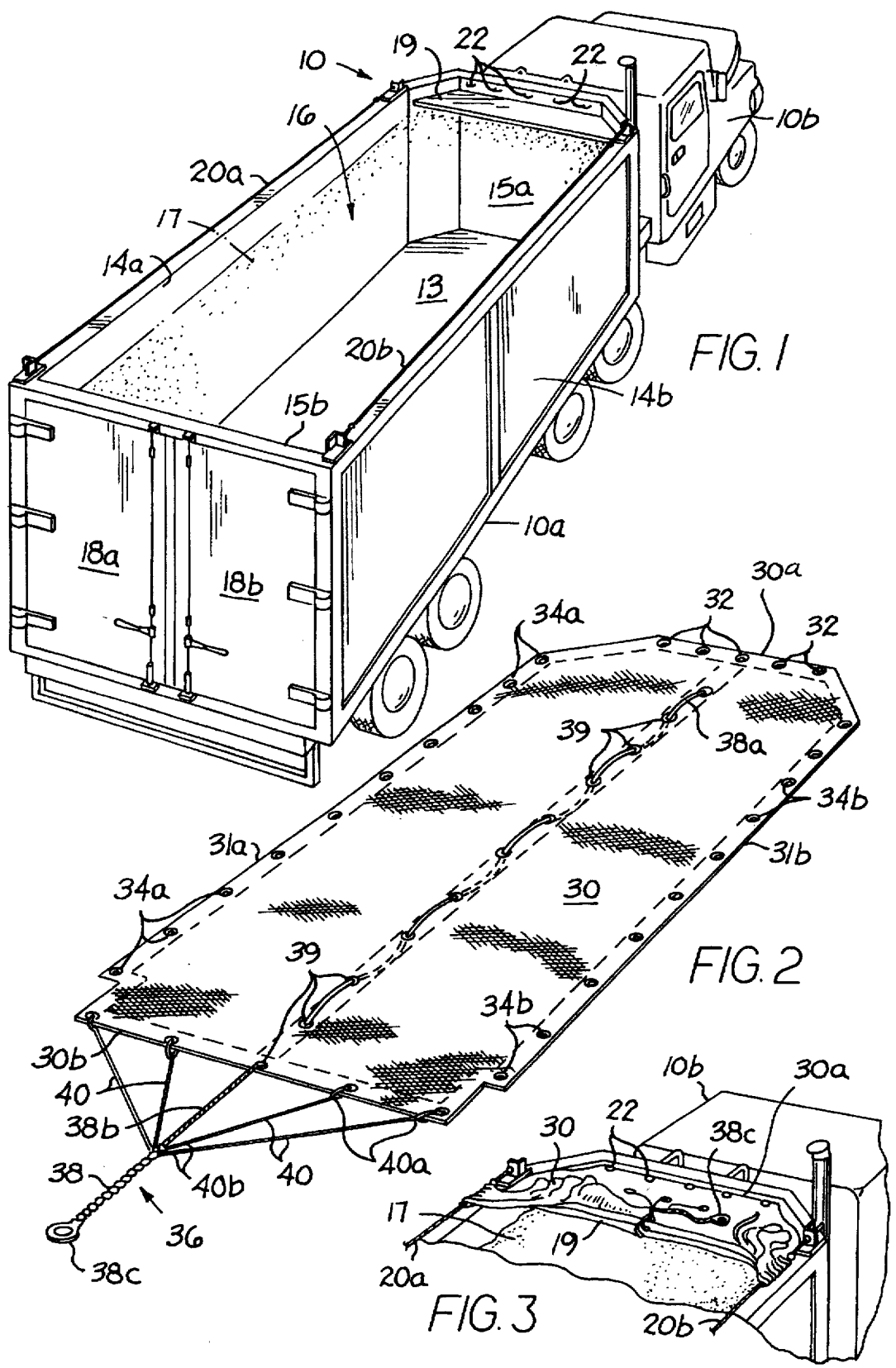

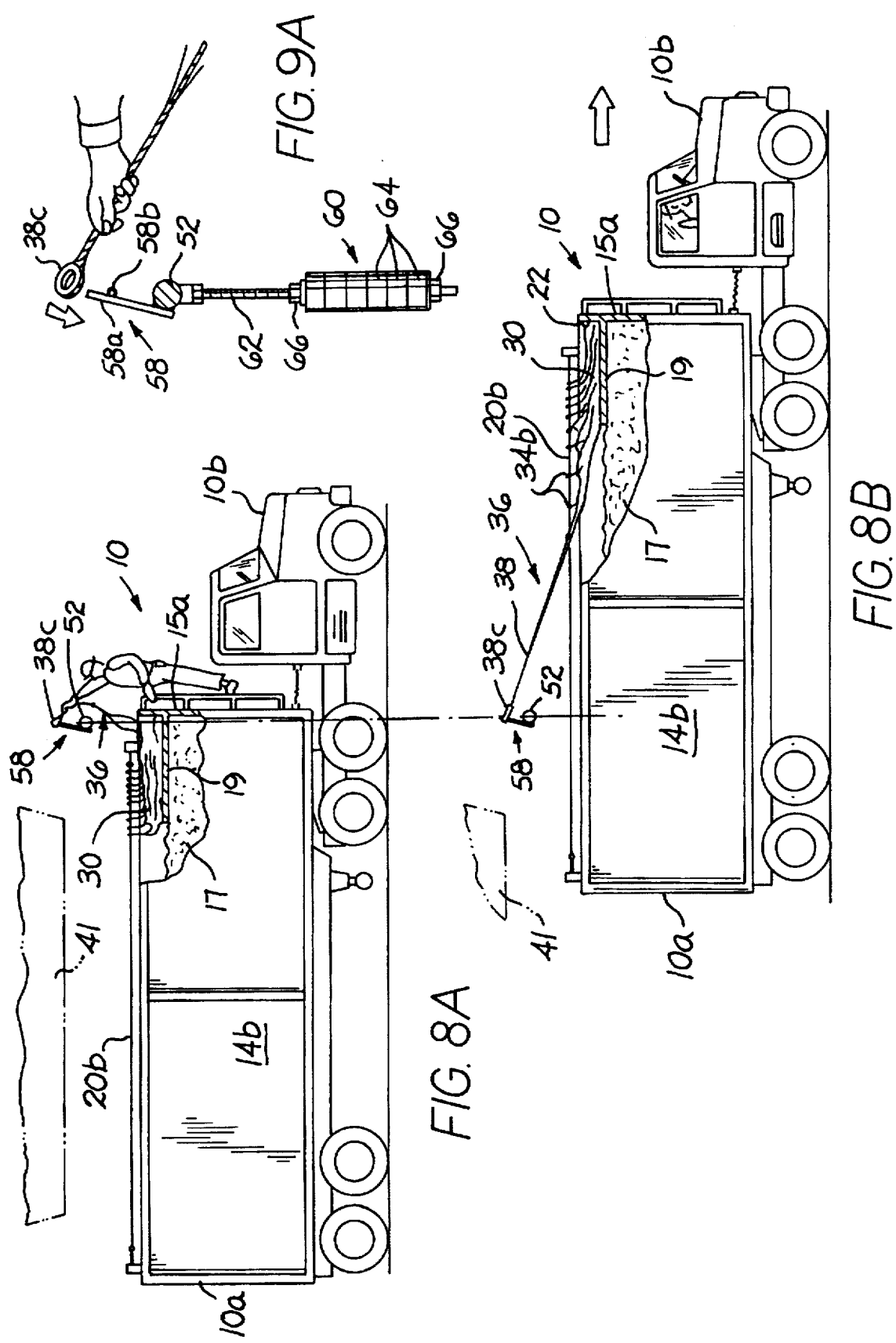

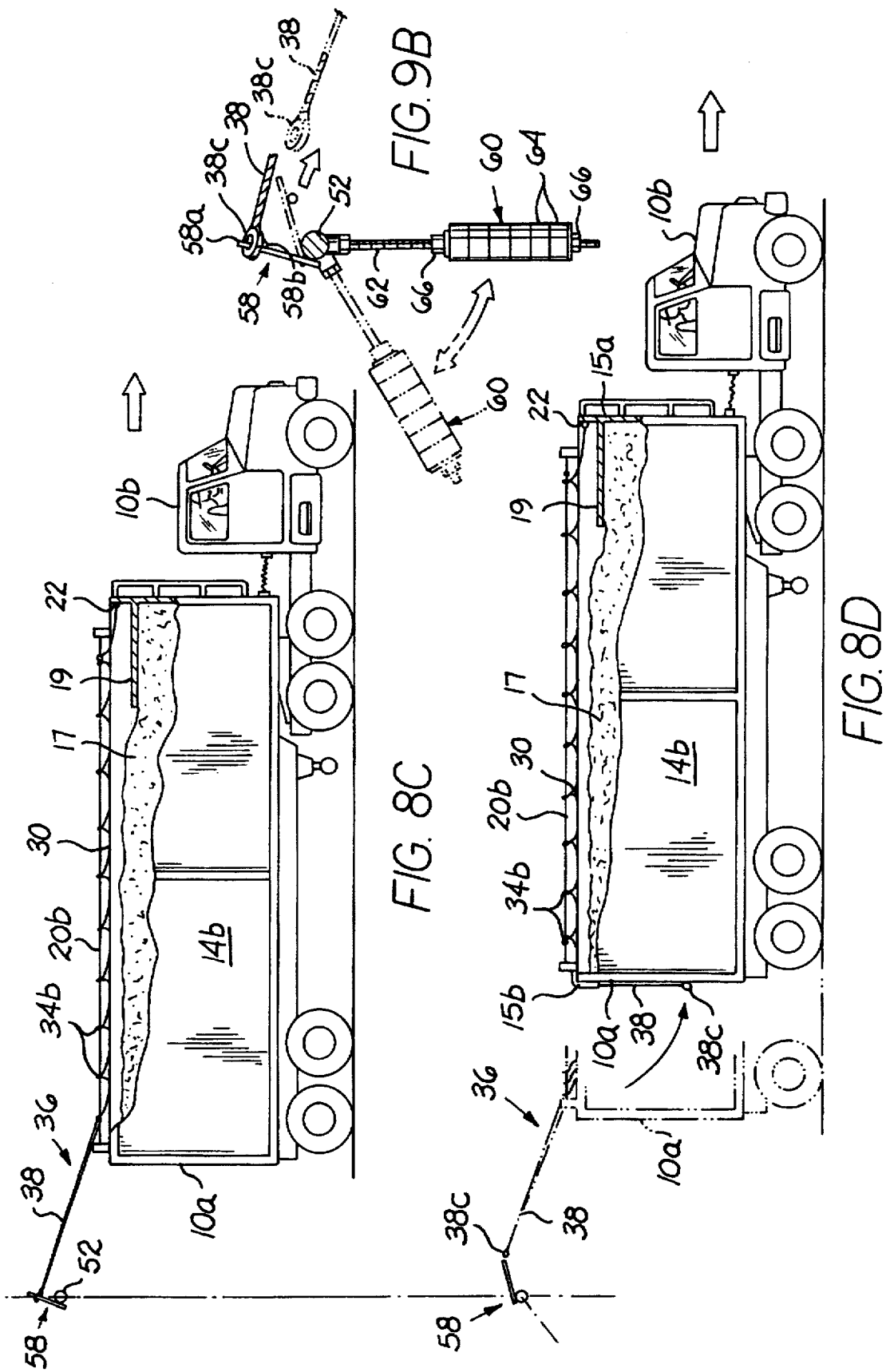

METHOD AND APPARATUS FOR COVERING AN OPEN-TOP TRAILER

FIELD OF THE INVENTION

The present invention relates generally to truck trailers, and more particularly to covering truck trailers.

BACKGROUND OF THE INVENTION

In general, truck trailers for hauling loose material, such as wood chips and the like, have an open top to facilitate loading the trailer via a hopper or other device, such as a front-end loader, under which the trailer is positioned. In order to keep the loose material from blowing out of the trailer as it travels down the road, a cover is typically pulled snugly over the open top. In fact, open-top trailers hauling loose material are often required by law to be covered.

Various covers and devices for pulling covers over open-top truck trailers have been developed. Often used is a cover attached to the top of a trailer via cables that run along the top of both sides of the trailer. The side portions of the cover are slidably engaged with these cables by hooks or other connectors that allow the cover to be moved from an open position to a closed position whereupon the trailer is covered. Typically, the cover is secured to the front of the trailer and the cables hold the cover in place once it is pulled taut over the open top of the trailer.

Typically, after the loose material is loaded into such a trailer, the cover is pulled by hand over the open top. Unfortunately, this operation has several disadvantages. First of all, the risk of injury from falling off the trailer is somewhat high because a worker must climb over the load or along the sides of the trailer in order to pull the cover over the open top. Injuries from falls not only result in suffering and lost time to a worker, but also result in workers' compensation claims and increased insurance costs for the worker's employer. Second, this operation is time consuming because a worker must pull the trailer from underneath the hopper, stop the truck, and climb to the top of the trailer to pull the cover taut before proceeding.

SUMMARY OF THE INVENTION

One object of the present invention is to reduce the risk of personal injury when covering the open top of a trailer.

Another object of the present invention is to facilitate covering an open-top trailer, whereupon the trailer can be driven beneath a hopper, loaded, and covered in as short a period of time as possible.

These and other objects are accomplished according to one aspect of the present invention, by a bulk product transport system for covering an open-top trailer. A typical open-top trailer includes a floor with a respective pair of opposing side walls and opposing front and rear walls extending therefrom to define an open-top container. A guide extends along the upper edge portion of each of the side walls from the front wall to the rear wall of the trailer. Typically the guides are cables positioned adjacent and generally parallel with the upper edge portion of each of the trailer side walls.

A flexible cover, such as a tarpaulin, comprises a plurality of apertures spaced along opposing side portions. The apertures along each side portion receive a respective one of the cables, permitting the cover to be movable along the cables between an open position whereby the container can be loaded via the open top, and a closed position wherein the open top is covered. The flexible cover has a front end portion secured to the container adjacent the front wall, and is disposed adjacent the front wall when in the open position.

Rigging is connected to a rear end portion of the flexible cover and configured such that, when pulled, the cover is pulled along the cables from the open position to the closed position. The rigging includes an elongate primary cable having a first end connected to the flexible cover, and an opposite second end configured to engage a pulling device. The free end typically has a ring adapted to be received upon a projection extending from the pulling device when the shaft is in the first rotational position. The rigging further includes at least one secondary cable having a first end connected to the flexible cover rear end portion, and an opposing second end connected to the primary cable. The rigging may include a plurality of secondary cables.

A pulling device is mounted to a supporting frame at an elevation permitting the trailer to pass thereunder. The pulling device is configured to engage and pull the rigging such that the flexible cover is pulled from the open position to the closed position when the trailer is moved relative to the pulling device. The pulling device is also configured to automatically release the rigging when the flexible cover attains the closed position.

According to another aspect of the present invention, a pulling device for pulling a flexible cover over an open-top trailer includes a shaft rotatable about a substantially horizontal axis between first and second rotational positions. A projection extends radially outwardly from a medial portion of the shaft, and is configured to extend upwardly and engage the primary cable second end when the shaft is in the first rotational position. The projection is also configured to disengage from the primary cable second end when the shaft is in the second rotational position. Typically, a bulk product dispensing hopper is mounted adjacent the pulling device for dispensing bulk products into the open-top container when the cover is in the open position.

The pulling device also includes a counterweight assembly extending radially outwardly from the shaft. The counterweight assembly is positioned to bias the shaft from the second rotational position toward the first rotational position. The shaft is rotated from the first rotational position to the second rotational position against the biasing force of the counterweight assembly to release the primary cable when the flexible cover has been pulled from the open position to the closed position. The counterweight assembly may include a plurality of removable weights.

According to another aspect of the present invention, an apparatus for pulling a flexible cover over an open-top container, wherein the flexible cover is movable between an open position and a closed position, includes a shaft mounted for rotation about a substantially horizontal axis between first and second rotational positions. The shaft is supported at an elevation sufficient to permit said container to pass underneath. A projection extends radially outwardly from a medial portion of the shaft, and is configured to extend upwardly and engage the flexible cover when the shaft is in the first rotational position. The projection is configured to disengage the flexible cover when the shaft is in the second rotational position. A biasing device is configured to bias the shaft from the second rotational position to the first rotational position.

According to another aspect of the present invention, an apparatus for pulling a flexible cover over an open-top container, wherein the flexible cover is movable between an open position and a closed position, includes a shaft mounted for rotation between first and second rotational positions. The shaft is supported at an elevation sufficient to permit a container to pass underneath. A projection extends radially outwardly from the shaft, and is configured to engage the flexible cover when the shaft is in the first rotational position. The projection is also configured to disengage the flexible cover when the shaft is in the second rotational position. A biasing device is configured to bias the shaft from the second rotational position to the first rotational position.

According to another aspect of the present invention, a method for covering an open-top trailer with a flexible cover, wherein the flexible cover is movable between an open position and a closed position includes removably engaging the free end of the flexible cover to a rotatable shaft. The trailer and shaft are then moved relative to one another so that the flexible cover is pulled from the open position to the closed position, and then the flexible cover free end is automatically disengaged from the shaft. The trailer is typically moved beneath the shaft. The shaft is rotatable between first and second rotational positions, whereby the free end of the flexible cover is engaged by the shaft when the shaft is in the first rotational position. The free end of the flexible cover is automatically disengaged from the shaft when the shaft is in the second rotational position.

The present invention is advantageous for several reasons. First, worker safety is enhanced by eliminating the need for a person to climb onto a loaded trailer and physically pull the cover over the load. Secondly, once the cover rigging is engaged with the pulling apparatus, the truck operator may simply drive the truck and trailer tandem forward, without stopping, thereby decreasing the time required to ready a trailer for transport.

BRIEF DESCRIPTION OF THE DRAWINGS

FIG. 1 is a perspective view of an open-top truck trailer used for bulk products.

FIG. 2 is a perspective view of a cover used for covering the open-top trailer depicted in FIG. 1.

FIG. 3 illustrates the cover depicted in FIG. 2 in an open position.

FIGS. 8A–8D illustrate operations for covering an open-top trailer according to the present invention.

FIGS. 9A–9B are cross-sectional views of the apparatus illustrated in FIG. 5, taken along lines 9—9, and illustrating first and second positions of the apparatus during operation.

DETAILED DESCRIPTION OF PREFERRED EMBODIMENTS

Figure 4:
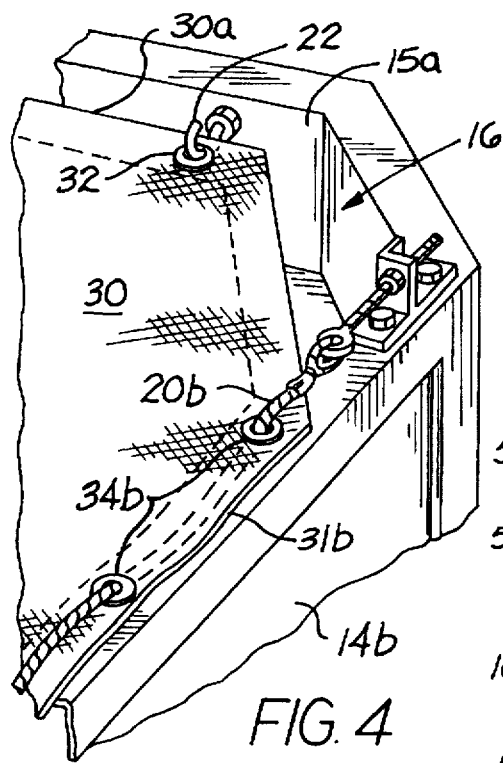
FIG. 4 illustrates how the cover, depicted in FIG. 2, is typically attached to an open-top trailer.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to FIG. 1, a truck and trailer tandem 10 for hauling bulk products, including wood chips and the like, is illustrated. The open-top trailer 10a, which is configured to be pulled by the truck 10b, has a generally rectangular shape and comprises a floor 13 and opposing side walls 14a,14b, and opposing front and rear end portions 15a,15b extending upwards therefrom to define a container 16 for receiving and transporting material 17. As is conventional, the rear end portion 15b comprises a pair of hinged doors 18a,18b which are maintained in a closed position when loading and transporting the material 17.

Referring now to FIG. 2, a flexible cover 30 covering open-top trailers is illustrated. The cover 30 is typically made from rugged mesh material, and can be made from waterproof material such as canvas. The cover 30 often has the same general shape as the open top of the trailer 10a, and is configured to slide along the top of the trailer between an open and closed position. In the illustrated embodiment, the cover 30 comprises opposing front and rear end portions 30a,30b, and opposing side portions 31a,31b. A plurality of apertures 32 are spaced along the front end portion 30a of the cover 30. Each one of the apertures 32 is configured to engage a respective one of a plurality of hooks 22 similarly-spaced along the front end portion 15a of the trailer 10a. The apertures 32 are preferably, eyelets or grommets integrally connected with the front end portion 30a of the cover 30. However, other fastening means, as would be known to those having skill in the art, may be used to secure the front end portion 30a of the cover 30 to the front end portion 15a of the trailer 10a.

A plurality of apertures 34a,34b are spaced along respective side portions 31a,31b of the cover 30. Each aperture 34a,34b, is configured to slidably engage a respective cable 20a,20b positioned above each trailer side wall 14a,14b, as illustrated in FIG. 4. The cables 20a,20b provide means for guiding the cover 30 between an open position, whereby access to the trailer via the open top is provided, and a closed position, whereby the open top of the trailer is covered. When the rear end portion 30b of the cover 30 is pulled, via the rigging 36 (described below), the cover slides along the top of the trailer to cover the open top of the trailer. The apertures 34a,34b are preferably eyelets or grommets integrally connected with the side portions 31a,31b of the cover 30. However, other connecting means for slidably engaging the cover 30 to the cables 20a ,20b, such as hooks or cable loops, may be used, as would be known by those having skill in the art. When not covering the open top of the trailer 10a, the cover 30 is generally bundled towards the front end portion 15a of the trailer and supported on a shelf 19 integral to the trailer, as illustrated in FIG. 3.

Referring back to FIG. 2, the rigging 36 for pulling the cover 30 over the trailer 10a is illustrated. In the illustrated embodiment, the rigging 36 comprises an elongate primary cable 38 having opposite first and second end portions 38a and 38b, and a plurality of elongate secondary cables 40 having opposite first and second end portions 40a and 40b, respectively. In a preferred embodiment, the primary and secondary cables 34,36 are conventional galvanized steel cables. However, the rigging 36 may be comprised of rods, chain, ropes, or other members capable of withstanding the tensile forces necessary to pull the cover 30 over the open top of the trailer 10a.

To facilitate pulling the cover 30 evenly, the first end portions 40a of the secondary cables are connected to the rear cover portion 30b in a somewhat evenly-spaced configuration. In the illustrated embodiment, the second end portions 40b of the secondary cables 40 are secured to the primary cable 38 adjacent its second end portion 38b. The primary cable 38 is threaded through a plurality of apertures 39 positioned along a medial portion of the cover 30 and is secured to the cover adjacent the front end portion 30a. Preferably, the apertures 39 are equidistantly spaced such that the distance between adjacent apertures is the same for all the apertures. As would be understood by those having skill in the art, a variety of rigging configurations, including the number and type of cables used, and the manner in which they are secured to the cover, may be employed. A ring or loop 38c is secured to the primary cable second end portion 38b, and is configured to engage the pulling apparatus described in detail below.

Figure 5:
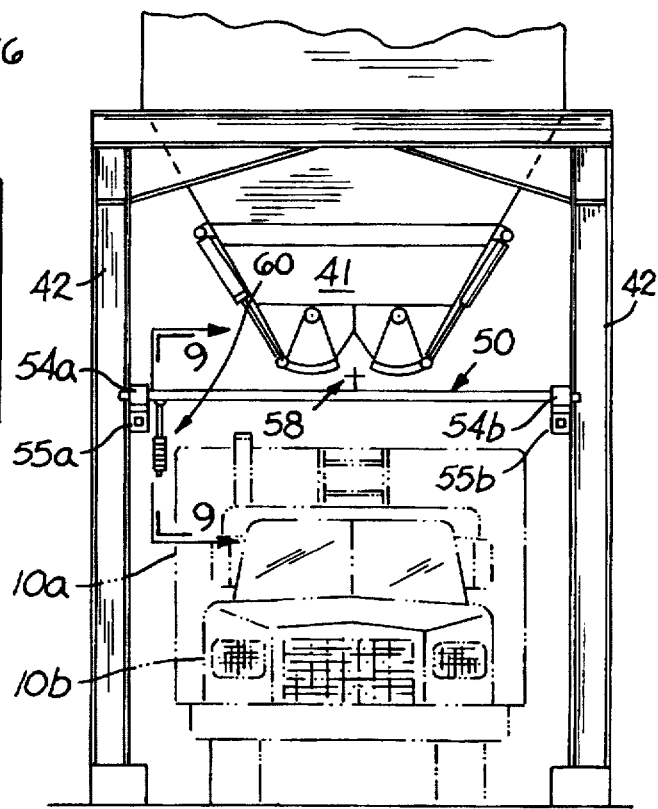
FIG. 5 is a front plan view illustrating a truck and trailer positioned beneath a hopper for loading, and also illustrating an apparatus for pulling a cover over the open top of the trailer, according to the present invention.

Referring now to FIG. 5, the location of a pulling apparatus 50 for pulling a cover over an open-top trailer, according to the present invention, is illustrated. The pulling apparatus 50 provides means for pulling the cover 30 between an open and closed position, as described below. Bulk products, including wood chips and other loose materials, are typically loaded into open-top trailers via suspended hopper assemblies. As illustrated in FIG. 5, the hopper assembly 41 is suspended at a height sufficient to permit a truck and trailer tandem 10 to pass thereunder. In the illustrated embodiment, the apparatus 50 is secured to the hopper supporting structure 42 and is also located at a height sufficient to permit the truck and trailer tandem 10 to pass thereunder.

Figure 6:
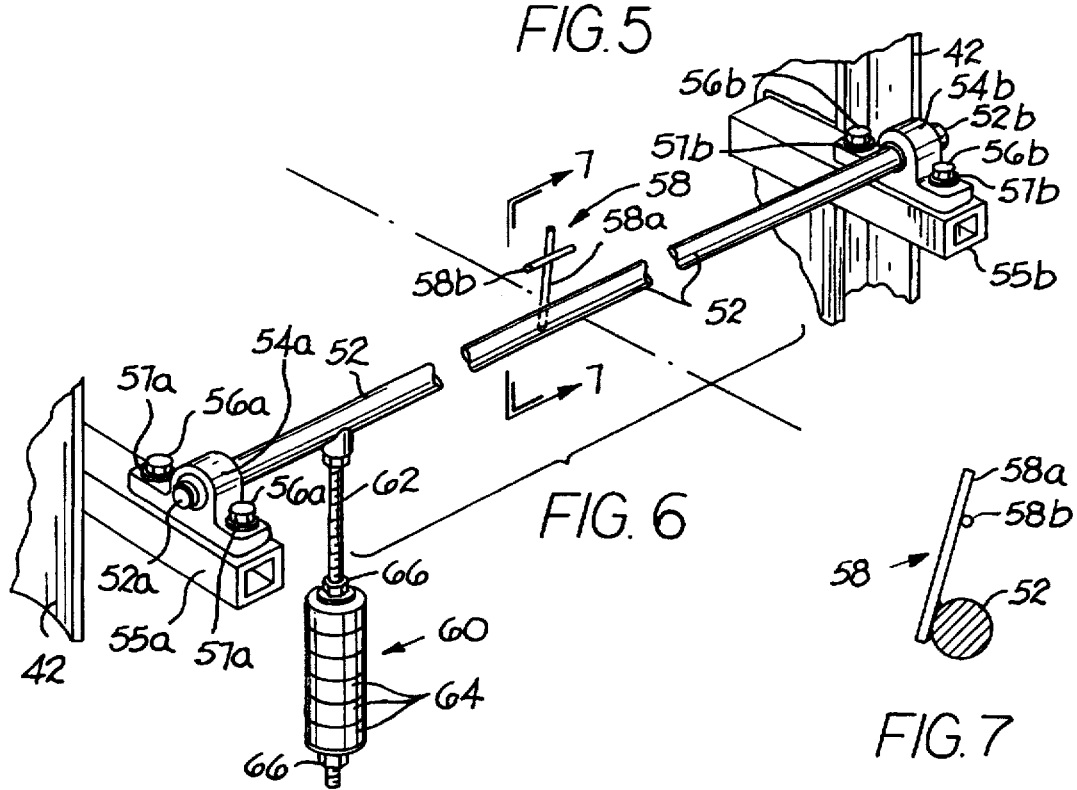
FIG. 6 is a perspective view of an apparatus for pulling a cover over the open top of a loaded trailer, according to the present invention.

Referring now to FIG. 6, a preferred embodiment of a cover pulling apparatus 50 is illustrated in greater detail. The illustrated apparatus 50 comprises a shaft 52 supported at each opposing end 52a,52b by pillow blocks 54a,54b, respectively. Preferably, the shaft is a two (2) inch solid steel shaft. In the illustrated embodiment, the pillow blocks 54a,54b are secured to structural members 55a,55b extending from the hopper supporting structure 42 via bolts 56a, 56b, washers 57a,57b, and nuts (not shown). The cover pulling apparatus 50 may be attached to the hopper supporting structure in a variety of ways. Furthermore, the cover pulling apparatus 50 may be supported so that a trailer can pass thereunder, after being loaded, in a variety of ways. The apparatus 50 does not have to be connected to the hopper support structure 42. Preferably, the shaft 52 should be allowed to rotate about ninety degrees (90°), and the apparatus 50 should be suspended at a height sufficient to permit a trailer 10a to pass underneath. As would be known by those having skill in the art, a variety of bushings or bearings may be used to facilitate shaft rotation within each one of the pillow blocks 54a,54b. In addition, the pillow blocks may be secured to its supporting structure in a variety of ways, including welding.

Still referring to FIG. 6, a projection 58, for engaging the primary cable 38, extends from the shaft 52 at a medial location. Preferably, the projection 58 is located at a point approximately halfway between each shaft end 52a,52b in order to facilitate even pulling of a cover 30, as will be described below. In the illustrated embodiment, the projection 58 is a generally T-shaped member comprising a first member 58a secured to the shaft 52, and a second member 58b secured to the first member. The projection 58 is configured so that the primary cable ring 38c can be inserted easily thereon for pulling the cover 30, and can be easily removed when the cover is pulled taut over the trailer. The second member 58b prevents the primary cable ring 38c from sliding too far down the first member 58a, thereby ensuring that the ring slides off easily without snagging.

Figure 7:
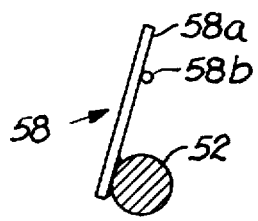
FIG. 7 is a cross-sectional view of the apparatus illustrated in FIG. 6, taken along lines 7—7.

Preferably the first and second members 58a,58b are solid steel rods having a diameter of three quarters of an inch (¾"), and are welded to each other and to the shaft as illustrated in FIG. 7. However, the projection 58 for engaging the primary cable ring 38c is not limited to a generally T-shape. Other projections of various shapes and configurations may be utilized whereupon the primary cable ring 38c can be easily inserted thereon and removed therefrom, as would be known by those having skill in the art.

In the illustrated embodiment, a counter-weight assembly 60 extends from the shaft 52 in a direction generally opposite from the projection 58. The purpose of the counterweight assembly 60 is to provide rotational resistance to the shaft 52 to facilitate pulling a cover, and to return the projection 58 to its initial position after a cover has been pulled over a trailer. The counterweight assembly 60 may be positioned anywhere along the shaft 52, as long as sufficient clearance is provided for a truck and trailer tandem 10 to pass beneath the pulling apparatus 50. Furthermore, the present invention may be carried out with other biasing means, such as a spring, whereby the shaft 52 resists rotation during the pulling of a cover and is returned to an initial position thereafter.

As a result of gravity, the counterweight assembly 60 causes the shaft 52 to rotate such that the counterweight assembly is pointing generally downwards towards the ground when the pulling apparatus 50 is not being used. Consequently, by positioning the projection 58, such that the first member 58a extends in a direction generally opposite from the counterweight assembly 60, the projection is pointing in a generally upwards direction, away from the ground, when the apparatus 50 is not being used.

Preferably, the counterweight assembly 60 comprises a threaded steel rod 62 having a plurality of steel weights 64 sandwiched between two steel nuts 66. Even more preferably, the threaded rod 62 is a one inch (1") threaded rod. By changing the number of weights 64, the rotational resistance of the shaft 52 is adjustable. By adding weights, greater resistance to rotation can be provided when heavier-weight covers are pulled. By removing weights, less rotational resistance can be provided when lighter-weight covers are pulled. This adjustable feature is advantageous because a heavier-weight cover may cause the shaft 52 to rotate prematurely, thereby releasing the primary cable ring 38c before the cover is pulled taut over a trailer. (The operation of the pulling apparatus 50 is described in greater detail below.) On the other hand, too much rotational resistance may prevent the shaft 52 from rotating and releasing the primary cable ring 38c when the cover is pulled taut, thereby potentially damaging or tearing lighter-weight covers. Alternatively, the counterweight assembly 60 may comprise a steel rod wherein weight is added by welding additional material onto the rod. Conversely, weight may be removed by cutting and removing a portion of the rod.

In the illustrated embodiment, the shaft 52 is positioned in, and rotates about, a generally horizontal axis. However, the shaft may be positioned in various other orientations and perform within the spirit and scope of the present invention. For example, the shaft 52 may have a generally vertical orientation and may rotate about a vertical axis. Biasing means for resisting rotation and for returning the shaft to an initial position may be provided by a spring.

Referring now to FIGS. 8A–8D, and 9A–9B, a method of covering an open-top trailer with the pulling apparatus 50 is illustrated. In FIG. 8A, a trailer 10a is shown positioned beneath a hopper 40. The trailer 10a has just been loaded with material, and the truck operator is proceeding to cover the loaded trailer with a cover 30 using the pulling apparatus 50. The truck operator climbs to the top of the forward end portion 15a of the trailer 10a where the cover 30 is stored during loading, and engages the rigging 36 with the pulling apparatus 50. Specifically, as shown in FIG. 9A, the ring 38c of the primary cable 38 is engaged with the projection 58 by placing the ring over the first member 58a.

Referring now to FIGS. 8B and 8C, the truck operator proceeds to move the truck and trailer tandem 10 in the direction indicated by driving forward. The movement of the trailer 10a relative to the pulling apparatus 50 causes the cover to slide along the top of the trailer via the cables 20a,20b towards the rear end portion 15b of the trailer. When the cover 30 becomes taut, the shaft 52 rotates such that the projection 58 rotates towards the trailer 10a, thereby releasing the primary cable ring 38c from the first member 58a (FIG. 9B). When the primary cable ring 38c becomes disengaged from the projection 58, the rigging 36 falls against the rear end portion 15b of the trailer 10a as illustrated in FIG. 8D. The rigging 36 need not be secured to the trailer. The frictional engagement of the apertures 34a,34b with the cables 20a,20b is sufficient to maintain the cover 30 in a taut position without the need for further securing the cover or the rigging to the trailer.

Consequently, once the rigging 36 is engaged with the pulling apparatus 50, the truck operator does not have to take any further action with respect to covering the open top of the trailer 10a. The movement of the trailer 10a relative to the pulling apparatus 50 is all that is required to cover the trailer. The counterweight assembly 60 causes the shaft 52 to rotate and return the projection 58 to its initial position once the loop 52c becomes disengaged from the first member 52a. The pulling apparatus 50 is then ready for another trailer to be positioned thereunder.

In an alternative embodiment of the present invention, the pulling apparatus 50 may be moved relative to the trailer 10a via movement of the apparatus, or via a combination of movements of both the trailer and apparatus. However, in the preferred embodiment, the trailer 10a is moved beneath a stationary pulling apparatus 50 by driving the truck and trailer tandem forward.

The present invention is not limited to covering open-top truck trailers. Virtually any open-top container can be covered using the methods and apparatus of the present invention. In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A bulk product transport system comprising:
   a trailer having a floor and a respective pair of opposing side walls and opposing front and rear walls extending therefrom to define an open-top container;
   guide means extending along an upper edge portion of each of said side walls generally from the front wall to the rear wall of said container;
   a flexible cover movable along said guide means between an open position disposed adjacent said front wall and permitting said container to be loaded via said open top, and a closed position wherein said open top is covered, said flexible cover having a front end portion secured to said container adjacent said front wall;
   rigging connected to a rear end portion of said flexible cover and configured such that, when pulled, said cover is pulled along said guide means from said open position to said closed position;
   pulling means mounted to a supporting frame at an elevation permitting said trailer to pass thereunder, and being configured to engage and pull said rigging such that said flexible cover is pulled from said open position to said closed position when said container is moved relative to said pulling means, and to automatically release said rigging when said flexible cover attains the closed position.

2. A system according to claim 1, wherein said guide means comprises a cable positioned adjacent and generally parallel with an upper edge portion of each of said side walls.

3. A system according to claim 2, wherein said flexible cover further comprises a plurality of apertures spaced along opposing side portions, said apertures along each side portion receiving a respective one of the cables.

4. A system according to claim 1, wherein said flexible cover is a tarpaulin.

5. A system according to claim 1, wherein said rigging comprises an elongate primary cable having a first end connected to said flexible cover, and an opposite second end configured to engage said pulling means.

6. A system according to claim 5, wherein said rigging further comprises at least one secondary cable having a first end connected to said flexible cover rear end portion, and an opposing second end connected to said primary cable.

7. A system according to claim 6, wherein said at least one secondary cable comprises a plurality of cables.

8. A system according to claim 1, wherein said pulling means comprises:
   a shaft rotatable about a substantially horizontal axis between first and second rotational positions;
   a projection extending radially outwardly from a medial portion of said shaft, said projection configured to extend upwardly and engage said primary cable second end when said shaft is in said first rotational position, and to disengage from said primary cable second end when said shaft is in said second rotational position; and
   a counterweight assembly comprising a plurality of removable weights extending radially outwardly from said shaft and positioned to bias said shaft from said second rotational position toward said first rotational position, wherein said shaft is rotated from said first rotational position to said second rotational position against the biasing force of said counterweight assembly to release the primary cable when the flexible cover has been pulled from said open position to said closed position.

9. A system according to claim 8, wherein said rigging comprises an elongate primary cable having a first end connected to said flexible cover and an opposite free end, said free end having a ring which is adapted to be received upon said projection when said shaft is in said first rotational position.

10. A system according to claim 1, further comprising a bulk product dispensing hopper mounted to said supporting frame and adjacent said pulling means, for dispensing bulk products into said open-top container when the cover is in said open position.

11. An apparatus for pulling a flexible cover over an open-top container, wherein said flexible cover is movable between an open position permitting access to said container via said open top, and a closed position wherein said container open top is covered, said flexible cover having a front end secured to said container, and an opposite free end, said apparatus comprising:

a shaft mounted for rotation about a substantially horizontal axis and between first and second rotational positions, said shaft supported at an elevation sufficient to permit said container to pass underneath;

a projection extending radially outwardly from a medial portion of said shaft, said projection configured to extend upwardly and engage said flexible cover when said shaft is in said first rotational position and to disengage said flexible cover when said shaft is in said second rotational position; and biasing means configured to bias said shaft from said second rotational position to said first rotational position.

12. An apparatus according to claim 11, wherein said shaft is positioned adjacent a hopper assembly for dispensing material into a container positioned below.

13. An apparatus for pulling a flexible cover over an open-top container, wherein said flexible cover is movable between an open position permitting access to said container via said open top, and a closed position wherein said container open top is covered, said flexible cover having a front end secured to said container, and an opposite free end, said apparatus comprising:

a shaft mounted for rotation between first and second rotational positions, said shaft supported at an elevation sufficient to permit said container to pass underneath;

a projection extending radially outwardly from said shaft, said projection configured to engage said flexible cover when said shaft is in said first rotational position and to disengage said flexible cover when said shaft is in said second rotational position; and biasing means configured to bias said shaft from said second rotational position to said first rotational position.

14. An apparatus according to claim 13, wherein said shaft is positioned adjacent a hopper assembly for dispensing material into a container positioned below.

15. A flexible cover for covering open-top containers including:

a rear end portion comprising a plurality of equidistantly spaced apart apertures;

an opposing front end portion;

an elongate primary cable having a first end secured adjacent said cover front end portion, an intermediate portion threaded through a plurality of equidistantly spaced apart apertures in said cover medial portion between said front and rear end portions, and an opposite free end; and a plurality of secondary cables each having a first end secured to a respective aperture in said cover rear end portion, and an opposing second end connected to said primary cable adjacent said free end.

* * * * *